(12) United States Patent
Metz

(10) Patent No.: US 10,278,532 B2
(45) Date of Patent: May 7, 2019

(54) HOUSEHOLD APPLIANCE AND ELECTRICAL HEATING ELEMENT FOR USE IN A HOUSEHOLD APPLIANCE

(71) Applicant: Miele & Cie. KG, Guetersloh (DE)

(72) Inventor: Thomas Metz, Buende (DE)

(73) Assignee: MIELE & CIE. KG, Guetersloh (DE)

( * ) Notice: Subject to any disclaimer, the term of this patent is extended or adjusted under 35 U.S.C. 154(b) by 0 days.

(21) Appl. No.: 15/803,869

(22) Filed: Nov. 6, 2017

(65) Prior Publication Data

US 2018/0125282 A1  May 10, 2018

(30) Foreign Application Priority Data

Nov. 8, 2016 (DE) ................ 10 2016 121 306

(51) Int. Cl.

| H05B 3/10 | (2006.01) |
|---|---|
| H05B 3/12 | (2006.01) |
| H05B 3/20 | (2006.01) |
| A47J 27/05 | (2006.01) |
| F24C 1/00 | (2006.01) |
| F24C 7/02 | (2006.01) |
| F24C 7/06 | (2006.01) |
| H05B 1/02 | (2006.01) |
| H05B 3/52 | (2006.01) |
| H05B 6/64 | (2006.01) |
| A47J 27/04 | (2006.01) |

(52) U.S. Cl.
CPC ............ *A47J 27/05* (2013.01); *F24C 1/00* (2013.01); *F24C 7/02* (2013.01); *F24C 7/06* (2013.01); *H05B 1/0269* (2013.01); *H05B 3/52* (2013.01); *H05B 6/6479* (2013.01); *A47J 2027/043* (2013.01); *H05B 2203/02* (2013.01)

(58) Field of Classification Search
CPC ... H05B 1/0252; H05B 1/0258–1/0263; H05B 3/10–3/20
See application file for complete search history.

(56) References Cited

U.S. PATENT DOCUMENTS 2,600,485 A * 6/1952 Cox .................. H05B 3/06
219/541
4,710,350 A * 12/1987 Petersen .............. A61L 2/04
219/401

(Continued)

FOREIGN PATENT DOCUMENTS

| DE | 19523301 A1 | 1/1997 |
| DE | 102014112589 A1 | 3/2016 |

*Primary Examiner* — Michael A Laflame, Jr.
(74) *Attorney, Agent, or Firm* — Leydig, Voit & Mayer, Ltd.

(57) ABSTRACT

A household appliance includes: a treatment chamber for receiving goods to be treated, the treatment chamber having a bottom for collecting condensed water from a treatment process, the bottom of the treatment chamber having, on its side facing away from the treatment chamber, at least one flat heating element which heats the bottom of the treatment chamber in at least some regions by at least one electrical heating element, and evaporates the condensed water collected there into the treatment chamber. The electrical heating element includes a heating layer. The at least one flat heating element includes an electrical measuring element including a measuring layer.

15 Claims, 3 Drawing Sheets

(56) References Cited

U.S. PATENT DOCUMENTS

| | | | | |
|---|---|---|---|---|
| 4,891,498 A | * | 1/1990 | Fortmann | A47J 27/16 |
| | | | | 126/20 |
| 6,965,732 B2 | | 11/2005 | Golan | |
| 2013/0092682 A1 | * | 4/2013 | Mills | H05B 1/0263 |
| | | | | 219/702 |
| 2014/0004235 A1 | * | 1/2014 | Tonon | A23L 3/36 |
| | | | | 426/231 |

* cited by examiner

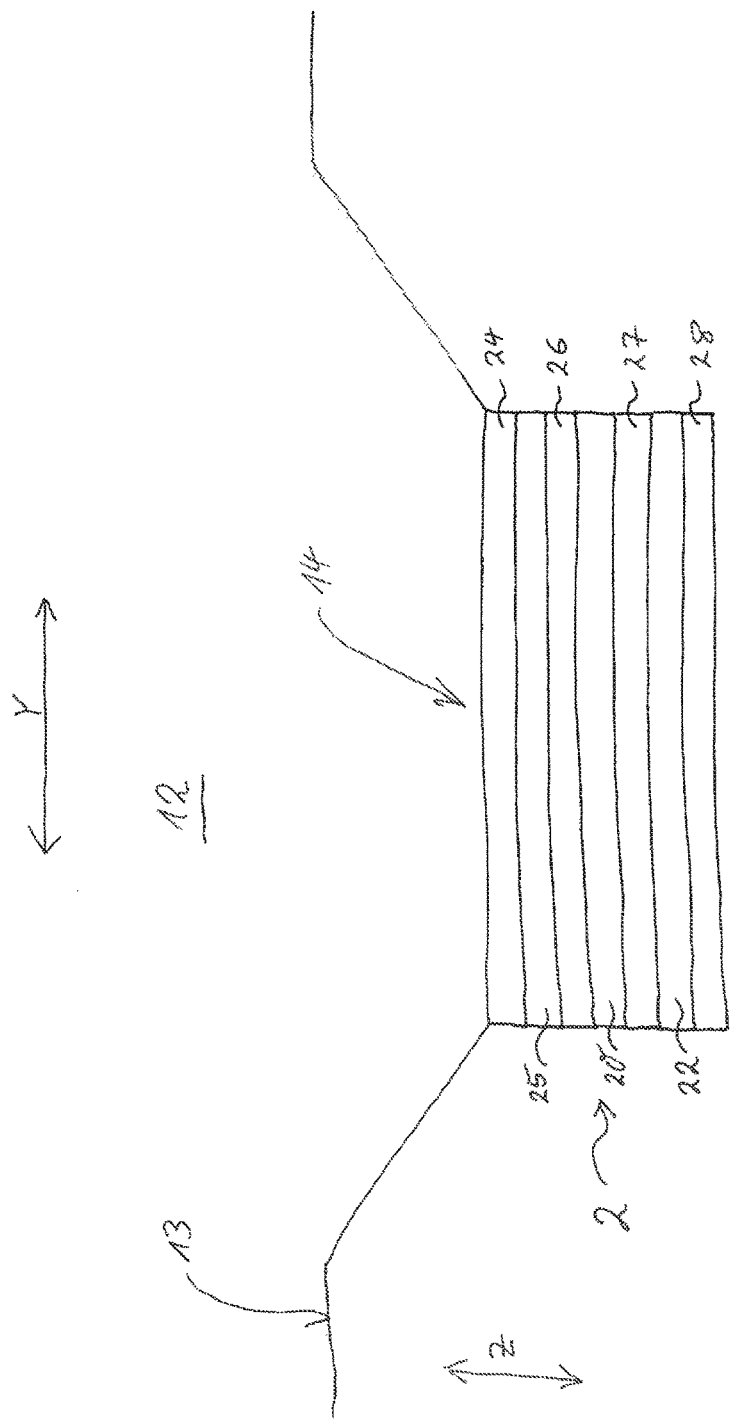

HOUSEHOLD APPLIANCE AND ELECTRICAL HEATING ELEMENT FOR USE IN A HOUSEHOLD APPLIANCE

CROSS-REFERENCE TO PRIOR APPLICATION

Priority is claimed to German Patent Application No. DE 10 2016 121 306.3, filed on Nov. 8, 2016, the entire disclosure of which is hereby incorporated by reference herein.

FIELD

The present invention relates to a household appliance, in particular a cooking appliance, such as a steam cooker, and to a flat heating element for use in such a household appliance.

BACKGROUND

Built-in type household appliance appliances in use today have a treatment chamber. In a household appliance in the form of a cooking appliance, the treatment chamber is also referred to as cooking chamber and serves to receive food to be cooked.

In various cultures, especially in the Asian culture, and very particularly in the Chinese culture, it is known to cook foods with hot steam. This way of preparing foods is referred to as steam cooking or steaming and is done using so-called steam cookers.

In a steam cooker, the foods to be cooked are exposed to steam of boiling water. When steam cooking at ambient pressure, the cooking temperature is 100° C., and when pressure steaming, the temperature is typically 120° C. For this purpose, water is evaporated inside the steam cooker by a heating device and supplied to the treatment chamber which holds the foods to be cooked, which are then cooked by the steam.

During the cooking process, the water partially condenses, for example, on the inner side of the treatment chamber, and collects as condensate at the lowest point of the treatment chamber. Thus, this condensate, or condensed water, is no longer available for the steam cooking process. Therefore, it is known to provide an additional heater in this region for re-evaporating the condensate collected there. The object of this is to reduce condensate, to increase the volume of stream, and to reduce the duration and cost of the cooking process.

A heating device for evaporating condensate from an air conditioner is disclosed in U.S. Pat. No. 6,965,732 B2. The heating device shown is disposed in a treatment chamber and composed of a plurality of resistance heating elements, which are covered on opposite sides by planar electrodes.

It is known from steam cookers of the Miele company to provide an opening in the bottom in the lower region of the treatment chamber, and to insert a heating element therethrough to evaporate the condensate.

The disadvantage here is that this opening for passage of the electrical leads of the heating element must be provided with a seal to prevent condensate from leaking downwardly out of the treatment chamber at this location. This increases the complexity of assembly and adds to the material costs. Moreover, the durability of this seal may constitute a weak point for the long-term durability of the steam cooker.

Another disadvantage is that this arrangement is not impervious to microwaves, and therefore cannot be used with combined appliances which include both a steam cooker and a microwave.

In order to make this additional heater suitable for use in microwave applications, an electrically conductive connection may be created between the treatment chamber and the heating element using a wire mesh, so that no radiation can leak out through this opening during microwave operation. However, this wire mesh makes manufacture more complex and correspondingly more expensive. Moreover, in the case of long-term use, for example over a 20-year lifetime of the appliance, there is a risk that the electrical connection between the treatment chamber and the heating element may deteriorate because of corrosion due to leakage or oxidation and that radiation may leak out.

In order to avoid these drawbacks, it is known from the combi-steam cookers with microwave of the Miele company to provide a foil heating element for evaporating condensate below the lower region of the treatment chamber, where the condensate can collect. More specifically, the foil heater is disposed under the bottom of the treatment chamber in this region and is typically composed of the following layers: self-adhesive film, silicone, glass silk, etched resistor layer of metal, and silicone. This makes it possible to heat the bottom of the treatment chamber across the surface thereof and to effectively evaporate the condensate.

A disadvantage here is that when the condensate has evaporated at any point of the foil-heating element, the temperature of the foil-heating element may increase at this point to such an extent that the foil-heating element destroys itself.

In order to avoid this, a PT-1000 temperature sensor (platinum measuring resistor) is mounted at the highest point of the three-dimensionally adhesively attached foil heating element, so that the temperature of the foil heating element can be monitored at this point. If an excessively high temperature of, for example, about 145° C. is sensed at this point, the electronics of the combi-steam cooker with microwave may cut off the electrical power to the foil heater. Since generally this highest point of the bottom of the treatment chamber is the first to be dried by the foil heater, it is thus possible to protect the foil heater from overheating. In addition, a thermal cutoff is mounted at another position of the bottom of the treatment chamber. The thermal cutoff is also capable of protecting the foil heating element from overheating. Such a foil heater is disclosed in German Patent Publication DE 10 2014 112 589 A1, this foil heater having a safety device which is attached to or associated with the foil heater and serves to prevent overheating of the heater and/or the bottom.

German Patent Publication DE 195 23 301 A1 describes a heater for a high-temperature metal oxide sensor having a conductive heating track and a conductive measuring track. The conductive heating track is U-shaped and encloses in its interior the conductive measuring track, which is also U-shaped.

The disadvantage here is that the heating element can be protected from overheating only at certain points. Therefore, if the appliance stands in an inclined position or if the treatment chamber was mounted non-parallel to the treatment chamber bottom, it may occur that a different point of the foil heater is dried first and that this cannot be detected, so that the foil heating element may destroy itself despite measuring the temperature.

Another disadvantage is that the maximum temperature of the foil heating element, which is about 140° C., is limited by the self-adhesive layer of the foil heating element. This low temperature resistance of the self-adhesive layer requires a low power density of the foil heating element in order to protect it from overheating. As a result, the heating element must have a relative large surface area to be able to provide the heating required for drying the condensate. This, in turn, may increase the manufacturing cost or result in slower evaporation of the condensate. Furthermore, this may increase the amount of residual condensed water.

From the combi-steam cookers with microwave of the V-Zug company, it is known to provide an assembly including a plurality of positive temperature coefficient (PTC) heating elements under the bottom of the treatment chamber. The PTC heating elements have the characteristic that their electrical resistance increases with increasing temperature. This enables the PTC heating elements to self-limit their power input and thus their further heating without having to take additional measures. Furthermore, the individual PTC heating elements can limit themselves independently of each other; i.e., it is insignificant which of the PTC heating elements is free of condensate first.

However, the disadvantage here is that the heat transfer from the PTC heating elements into the bottom of the treatment chamber is relatively low compared, for example, to a foil heating element that is adhesively bonded to the underside of the treatment chamber bottom over a large surface area thereof, so that only little heat output can be transferred to the bottom of the treatment chamber. This effect may be aggravated by the fact that the energized PTC heating elements are wrapped in Kapton film for electrical insulation, which may hinder the transfer of heat.

From the steam cookers of the Backer company, it is known to heat the region of the treatment chamber bottom where condensate can accumulate using a foil heating element having small, parallel-connected heating elements which are self-controlled by a PTC effect.

The disadvantage here is that only a temperature range of up to about 70° C. can be used in this manner.

SUMMARY

In an embodiment, the present invention provides a household appliance, comprising: a treatment chamber configured to receive goods to be treated, the treatment chamber having a bottom configured to collect condensed water from a treatment process, the bottom of the treatment chamber having, on its side facing away from the treatment chamber, at least one flat heating element which is configured to heat the bottom of the treatment chamber in at least some regions by at least one electrical heating element, and to evaporate the condensed water collected there into the treatment chamber, wherein the electrical heating element comprises a heating layer, and wherein the at least one flat heating element comprises an electrical measuring element comprising a measuring layer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 is a schematic side view of a portion of the treatment chamber of a steam cooker, showing a flat heating element of an inventive steam cooker according to a second exemplary embodiment.

DETAILED DESCRIPTION

Figure 1:
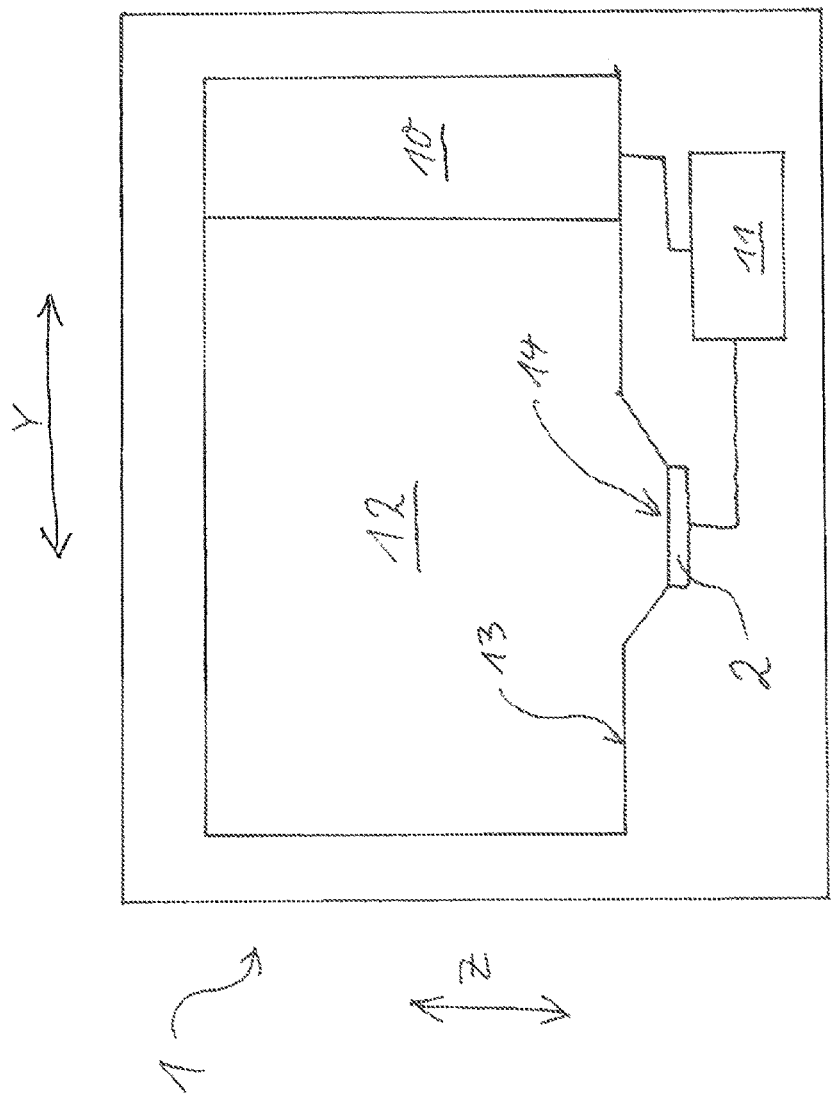
FIG. 1 is a cross-sectional schematic side view of a known steam cooker.

Thus, the present invention relates to a household appliance, in particular a steam cooker, preferably combined with a microwave. The steam cooker may be a pressureless steam cooker or a pressure steam cooker. The steam cooker has a treatment chamber for receiving foods to be cooked, also referred to as goods to be cooked, such as in particular foods. The treatment chamber has a bottom adapted to collect condensed water from a treatment process, such as a steam cooking process. On its side facing away from the treatment chamber, the bottom of the treatment chamber has at least one flat heating element which is adapted to heat the bottom of the treatment chamber in at least some regions by at least one electrical heating element, and to evaporate the condensed water collected there into the treatment chamber.

The present invention provides that the electrical heating element be a heating layer, the flat heating element further having an electrical measuring element in the form of a measuring layer and/or that the electrical heating element be a conductive heating track that is at least partially, preferably completely, surrounded by a conductive measuring track.

This has the advantage of allowing monitoring of the entire heating surface and eliminates the need for the heating element to have a three-dimensional geometry. This may result in a more efficient evaporation, making it possible to reduce the amount of residual condensed water because it is no longer mandatory that condensed water remain on the main surface of the heating element.

Furthermore, this has the advantage of eliminating the need for a separate electrical measuring element, such as a separate PT-1000 temperature sensor and its electrical leads and fastening means. This can significantly reduce the complexity of assembly and the material costs.

The advantage of arranging the conductive measuring track completely around the conductive heating track is that this allows monitoring of the entire circumference of the heating surface. This is achievable, in particular, if the conductive measuring track surrounds the conductive heating track at the outer margin thereof. This allows the conductive measuring track to detect local temperature increases based on the heat distribution from the conductive heating track within the flat heating element, thereby eliminating the need to sense the temperature locally at a raised point. This can enhance the temperature-sensing quality and thus the temperature-monitoring reliability.

The flat heating element is preferably a foil heater. This allows the flat heating element to be made very flat and used in a space-saving manner, particularly in terms of height, Moreover, the attachment of a foil can be accomplished very easily and rapidly by means of adhesive bonding, for example. Preferably, a self-adhesive foil heater may be used for this purpose, which may further simplify and speed up assembly. Alternatively, the flat heating element may also be attached by vulcanization to the bottom of the treatment chamber.

In accordance with an aspect of the present invention, the conductive heating track and the conductive measuring track are disposed within the same layer of the flat heating element, which may simplify manufacture. Furthermore, the measurement accuracy can be enhanced in this manner because the heating of the heating conductor can act upon the measuring conductor more directly than if these conductors were disposed in different layers or even separated by additional layers, which might have a thermally insulating effect.

In accordance with another aspect of the present invention, the conductive heating track and/or the conductive measuring track are formed by etching. This may simplify manufacture, especially if the conductive heating track and the conductive measuring track are disposed within the same layer. In particular, the conductive heating track and/or the conductive measuring track may be formed by etching into a metal layer.

In accordance with an aspect of the present invention, the heating layer is disposed between the bottom of the treatment chamber and the measuring layer. This makes it possible to achieve an efficient transfer of the heat generated by the heating layer to the bottom of the treatment chamber and thus to the condensate to be evaporated. At the same time, the temperature of the heating layer can be effectively sensed from the opposite side of the heating layer.

In accordance with a further aspect of the present invention, the measuring layer completely covers the heating layer. For this purpose, the surface area of the measuring layer is at least equal to the surface area of the heating layer. Preferably, the two surfaces are arranged to coincide with each other. This allows the temperature of the heating layer to be reliably sensed by the measuring layer. In other words, each point of the heating layer can be sensed by the measuring layer, which allows for reliable sensing of the temperature.

In accordance with another aspect of the present invention, the steam cooker further has a control unit for controlling at least the electrical heating of the electrical heating element in open and/or closed loop, the electrical measuring element being connected in signal communication with the control unit, so that the control unit can determine a property of the electrical measuring element and use it for controlling the electrical heating of the electrical heating element in open and/or closed loop.

In this way, the electrical measuring element can be connected in signal communication with the control unit, for example, via electrical terminals, so that a property or parameter of the electrical measuring element, such as, for example, the electrical conductivity or resistance, the electrical inductance and/or the electrical capacitance of the electrical measuring element, or the change thereof, can be detected and analyzed by the control unit to determine the temperature of the measuring element, or the change thereof. The temperature of the heating element can be inferred via this property or parameter of the electrical measuring element.

The so-determined temperature of the heating element may then be compared by the control unit to a predetermined upper threshold of an allowable temperature of the heating element. If this upper threshold of an allowable temperature of the heating element is exceeded, the power of the heating element may be reduced or completely cut off. This may be accomplished, for example, via a relay.

This method of monitoring temperature can be used for an electrical heating element in the form of a conductive heating track and an electrical measuring element in the form a conductive measuring track as well as for an electrical heating element in the form of a heating layer and an electrical measuring element in the form a measuring layer.

In accordance with a further aspect of the present invention, the electrical measuring element is a PTC measuring element. Thus, the above-described determination of the temperature of the heating element can be implemented in a very simple and cost-effective manner because such measuring elements having a temperature-dependent resistance are easy to analyze and permit reliable temperature determination.

In accordance with another aspect of the present invention, the electrical measuring element and the electrical heating element are connected in series, the electrical measuring element being a PTC measuring element. This allows the power of the heating element to be automatically reduced with increasing temperature because as the temperature of the heating element increases, the temperature of the measuring element increases as well, which results in an increase in the electrical resistance of the measuring element. This reduces the current flow through the measuring element and thus also through the heating element connected in series therewith, thereby reducing the heat output of the heating element.

This eliminates the need to determine the temperature of the heating element, which eliminates the complexity associated therewith This method of monitoring temperature can be used for an electrical heating element in the form of a conductive heating track and an electrical measuring element in the form a conductive measuring track as well as for an electrical heating element in the form of a heating layer and an electrical measuring element in the form a measuring layer.

In accordance with another aspect of the present invention, the bottom of the treatment chamber has a lowest region which is adapted to collect condensed water from a steam cooking process, the flat heating element being disposed in the lowest region. This allows the condensed water present there to be evaporated as effectively as possible.

In accordance with a further aspect of the present invention, the flat heating element is attached by vulcanization. This may involve more complexity than adhesive bonding, in particular than self-adhesive bonding, but may increase the service life and/or the temperature resistance of the flat heating element attached by vulcanization. Due to the higher temperature resistance, the heating element attached by vulcanization can have a higher power density, making it possible either to increase the power input to the flat heating element for the same surface area, or to increase the surface area of the flat heating element for the same power input.

The present invention also relates to an electrical heating element for use in a household appliance, such as a steam cooker as described above, the electrical heating element being either a conductive heating track that is at least partially, preferably completely, surrounded by a conductive measuring track, or the electrical heating element being a heating layer, the flat heating element further having an electrical measuring element in the form of a measuring layer. The respective properties and advantages have already been described earlier with reference to the inventive household appliance, and therefore will not be repeated here.

The household appliance in which the inventive heating element is used may also be, for example, an automatic washing machine or a dishwasher.

FIG. 1 shows, in cross-sectional side view, a household appliance 1 in the form of a known steam cooker 1. Steam cooker 1 extends in a transverse direction Y, which may also be referred to as width Y, as well as in a vertical direction Z perpendicular thereto, which may also be referred to as height Z. A longitudinal direction X, which may also be referred to as depth X, is oriented perpendicular to the aforementioned directions (compare FIG. 2).

Steam cooker 1 has within its housing a heating unit 10 capable of heating water into steam and introducing the steam into a treatment chamber 12 to cook the foods located therein. The steam cooking process may be controlled by a control unit 11 in open and/or closed loop.

Treatment chamber 12 has a bottom 13 that bounds treatment chamber 12 downwardly in the direction of height Z. Bottom 13 of treatment chamber 12 has a lowest region 14 formed as a depression approximately centrally in transverse direction Y and in longitudinal direction X. Condensed water (condensate), which may form, for example, on the side walls of treatment chamber 12 during the steam cooking process, can collect in this lower region 14.

To allow this condensed water to be used further in the steam cooking process, it is known to dispose a flat heating element 2 below the lowest region 14 of bottom 13, so that lowest region 14 can be heated and the condensed water collected there can be evaporated again. To this end, flat heating element 2 typically has an electrical heating element 20, whose Joule heat losses are used for heating the lowest region 14 of bottom 13.

In accordance with the present invention, this flat heating element 2 may be embodied in two ways, either of which provides a foil heater 2.

Figure 2:
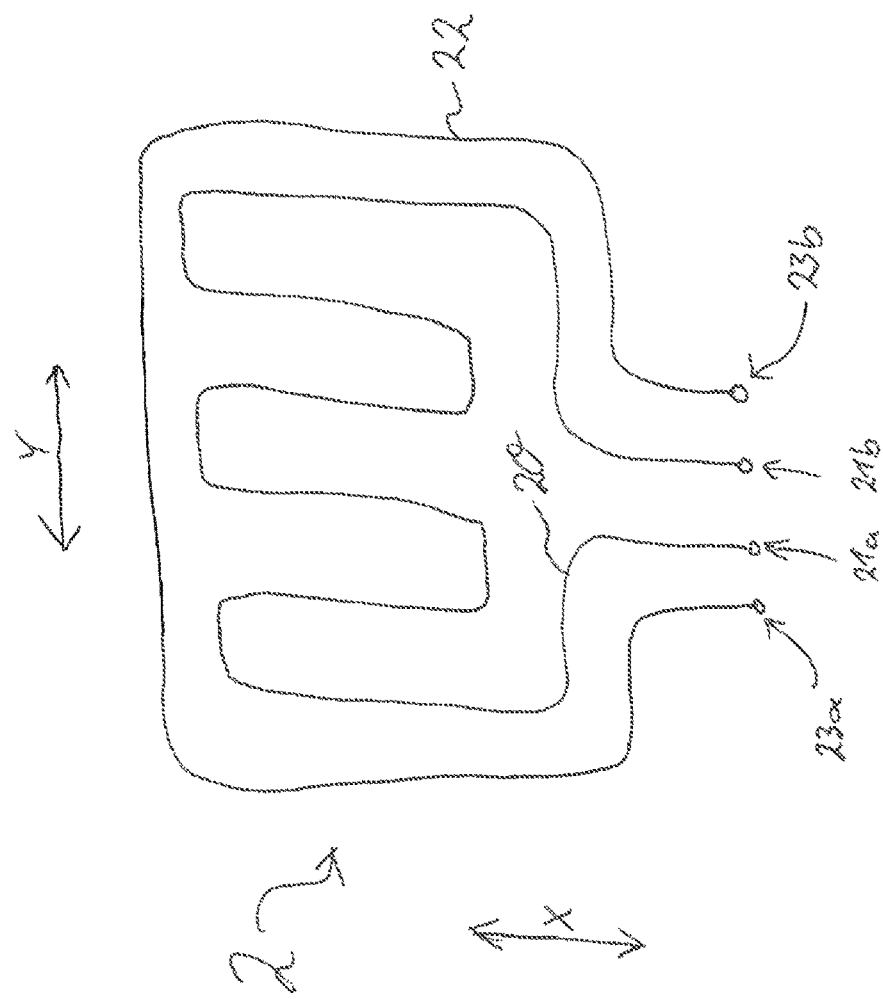
FIG. 2 is a schematic plan view of a flat heating element of an inventive steam cooker according to a first exemplary embodiment.

FIG. 2 shows, in schematic plan view, a flat heating element 2 of an inventive steam cooker 1 according to a first exemplary embodiment. In this case, electrical heating element 20 of foil heater 2 is embodied as a metallic conductive heating track 20 extending along a meandering path in the horizontal plane defined by transverse direction Y and longitudinal direction X. Conductive heating track 20 may be electrically powered, for example, from control unit 11, via two electrical terminals 21a, 21b to cause electrical heating of conductive heating track 20.

An electrical measuring element 22 in the form of a metallic conductive measuring track 22 is arranged around the meanders of conductive heating track 20 within the same layer of foil heater 2. Conductive measuring track 22 is configured as a PTC measuring resistor; i.e., its electrical resistance increases with increasing temperature. Conductive measuring track 22 has electrical terminals 23a, 23b, via which the electrical resistance of conductive measuring track 22 can be sensed, for example, by control unit 11, to determine therefrom the temperature of conductive measuring track 22. The temperature of conductive heating track 20 can then be inferred from the determined temperature of conductive measuring track 22, which allows control unit 11 to reduce the electrical power to conductive heating track 20 if an upper threshold of a predetermined temperature of conductive heating track 20 is reached or exceeded. Equally, the electrical power to conductive heating track 20 may be completely cut off.

Alternatively, conductive heating track 20 and conductive measuring track 22 may be connected in series, for example, by electrically conductively connecting the electrical terminals 21b and 23a together. Then, the series connection can be electrically powered from control unit 11 via the remaining terminals 21a and 23b. In this case, there is no need to sense the electrical resistance of conductive measuring track 22, it still being possible to limit electrical power to conductive heating track 20 when the temperature increases, because in this case the temperature-induced increase in the electrical resistance of conductive measuring track 22 automatically limits the electrical power input to conductive heating track 20.

FIG. 3 shows, in schematic side view, a portion of the treatment chamber 12 of a steam cooker 1, showing a flat heating element 2 of an inventive steam cooker 1 according to a second exemplary embodiment. In this case, electrical heating element 20 of foil heater 2 is embodied as a metallic heating layer 20, and electrical measuring element 22 is embodied as a metallic measuring layer 22. Heating layer 20 and measuring element 22 are configured and arranged to coincide with each other. This allows the measuring layer 22 to sense the temperature of heating layer 20 continuously across the surface thereof.

Here, foil heater 2 is formed of a plurality of layers and is adhesively bonded to the underside of bottom 13 of treatment chamber 12 in the lowest region 14 of bottom 13 via self-adhesive layer 24, which is located uppermost in the direction of height Z and which, in the direction of height Z, is followed downwardly by a first silicone layer 25, a first glass silk layer 26, heating layer 20, a second glass silk layer 27, measuring layer 22 and a second silicone layer 28.

In this exemplary embodiment, too, heating layer 20 and measuring layer 22 can be used to detect the electrical resistance of measuring layer 22 by means of control unit 11, to determine therefrom the temperature of heating layer 20, and to possibly reduce or cut off the electrical power input thereto.

Alternatively, heating layer 20 and measuring layer 22 can be connected in series and electrically powered from control unit 11 to achieve an automatic heat- and/or resistance-dependent reduction in the power input to the series connection.

In any case, it is possible to provide a more reliable, simpler and/or inexpensive way to use a flat heating element 2 for evaporating the condensate of a steam cooker 1 than has been known theretofore. In particular, the temperature of a flat heating element 2 can be measured more reliably, more readily and/or in a less expensive manner than has been known theretofore.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

X longitudinal direction; depth
Y transverse direction; width

Z vertical direction; height
1 household appliance, such as a steam cooker or a combi-steam cooker with microwave
10 heating unit
11 control unit; electronics
12 treatment chamber
13 bottom of treatment chamber 12
14 lowest region of bottom 13
2 flat heating element; foil heater
20 electrical heating element; conductive heating track; heating layer
21a, b electrical terminals of heating element 20
22 electrical measuring element; conductive measuring track; measuring layer
23a, b electrical terminals of measuring element 22
24 self-adhesive layer
25 first silicone layer
26 first glass silk layer
27 second glass silk layer
28 second silicone layer

What is claimed is:

1. A household appliance, comprising:
a treatment chamber configured to receive goods to be treated, the treatment chamber having a bottom configured to collect condensed water from a treatment process, the bottom having a side facing away from the treatment chamber and a side facing toward the treatment chamber, on the side facing away from the treatment chamber the bottom having at least one flat heating element configured to heat the bottom in at least some regions by at least one electrical heating element, and to evaporate the condensed water collected there into the treatment chamber,
wherein the electrical heating element comprises a heating layer,
wherein the at least one flat heating element comprises an electrical measuring element comprising a measuring layer, and
wherein the electrical heating element comprises a conductive heating track that is completely surrounded by a conductive measuring track.

2. The household appliance as recited in claim 1, wherein the conductive heating track and the conductive measuring track are disposed within a same layer or plane of the at least one flat heating element.

3. The household appliance as recited in claim 1, wherein the heating layer is disposed between the bottom and the measuring layer.

4. The household appliance as recited in claim 1, wherein the measuring layer completely covers the heating layer.

5. The household appliance as recited in claim 1, wherein the conductive heating track and/or the conductive measuring track are/is formed by etching.

6. The household appliance as recited in claim 1, further comprising a control unit configured to control at least the electrical heating of the electrical heating element in open and/or closed loop, the electrical measuring element being connected in signal communication with the control unit, so that the control unit is configured to determine a property of the electrical measuring element and use it for controlling the electrical heating of the electrical heating element in open and/or closed loop.

7. The household appliance as recited in claim 6, wherein the electrical measuring element comprises a PTC measuring element.

8. The household appliance as recited in of claim 1, wherein the electrical measuring element and the electrical heating element are connected in series, the electrical measuring element comprising a PTC measuring element.

9. The household appliance as recited in claim 1, wherein the bottom has a lowest region which is configured to collect condensed water from a treatment process, the at least one flat heating element being disposed in the lowest region.

10. The household appliance as recited in claim 1, wherein the at least one flat heating element is attached by vulcanization.

11. The household appliance as recited in claim 1, wherein the treatment chamber configured to receive goods to be treated comprises a cooking chamber configured to receive goods to be cooked.

12. The household appliance as recited in claim 1, wherein the household appliance comprises a steam cooker.

13. The household appliance as recited in claim 12, wherein the steam cooker comprises a combi-steam cooker with microwave.

14. The household appliance as recited in claim 1, wherein the at least one flat heating element comprises a foil heater.

15. An electrical heating element for use in a household appliance, the household appliance comprising:
a treatment chamber configured to receive goods to be treated, the treatment chamber having a bottom configured to collect condensed water from a treatment process, the bottom having a side facing away from the treatment chamber and a side facing toward the treatment chamber, on the side facing away from the treatment chamber the bottom having at least one flat heating element configured to heat the bottom in at least some regions by at least one electrical heating element, and to evaporate the condensed water collected there into the treatment chamber,
wherein the electrical heating element comprises a heating layer,
wherein the at least one flat heating element comprises an electrical measuring element comprising a measuring layer, and
wherein the electrical heating element is a conductive heating track that is completely surrounded by a conductive measuring track.

* * * * *